US006804170B1

(12) United States Patent
Chan

(10) Patent No.: US 6,804,170 B1
(45) Date of Patent: Oct. 12, 2004

(54) MULTIPLE-DISPLAY DEVICE

(75) Inventor: Sik-Leung Chan, New Territories (CN)

(73) Assignee: C. C. & L. Company Limited, Tsuen Wan (CN)

( * ) Notice: Subject to any disclaimer, the term of this patent is extended or adjusted under 35 U.S.C. 154(b) by 303 days.

(21) Appl. No.: 10/109,424

(22) Filed: Mar. 28, 2002

(51) Int. Cl.$^{7}$ ........................ G04B 19/00; G04B 37/00; G02F 1/1333; G02F 1/16

(52) U.S. Cl. ......................... 368/88; 368/223; 368/276; 368/316; 346/58; 361/681

(58) Field of Search ............................. 368/10, 82, 88, 368/223, 276, 281, 277; 40/733, 734, 781; D10/2, 15, 18, 31, 32, 39; 345/905; 349/58; 361/681

(56) References Cited

U.S. PATENT DOCUMENTS 3,132,432 A * 5/1964 Yee ............................. 40/730
3,178,842 A * 4/1965 Zimmerman ............. 40/661.06
4,371,077 A * 2/1983 Solitt et al. ................. 206/759
D303,503 S * 9/1989 Kai ............................. D10/31
D346,966 S * 5/1994 Oyanagi et al. ............... D10/2
5,384,756 A * 1/1995 Pelosi ........................ 368/281
5,887,373 A * 3/1999 Byers .......................... 40/733
D458,850 S * 6/2002 Fong ........................... D10/18

* cited by examiner

*Primary Examiner*—Vit W Miska
(74) *Attorney, Agent, or Firm*—Alix, Yale & Ristas, LLP

(57) ABSTRACT

A multiple-display device includes at least three body members disposed in juxtaposition. At least two of the body members are movable between first and second positions. Each body member has a display-In the first position at least two of the displays are hidden and in the second position all of the displays are visible. The displays are electronic displays indicating time, date or temperature.

5 Claims, 4 Drawing Sheets

MULTIPLE-DISPLAY DEVICE

BACKGROUND TO THE INVENTION

1. Field of the Invention

The invention relates to multiple-display devices, and in particular to electronic display device that indicates time, date and temperature.

2. Background Information

Small electronic Clocks that display time on a liquid crystal display are well-known. Often such clocks also indicate such other parameters as calendar, date, temperature, dual time and the like. In order to accommodate these additional parameters in a clear uncluttered fashion the liquid crystal display must be sufficiently large. Such large displays are undesirable for smaller clocks, such travel clocks for example. Furthermore, it is not always desired to view the additional parameters all of the time as often these detract from the main time display making it more difficult to read at a glance.

SUMMARY OF THE INVENTION

It is an object of the present invention to provide a multiple-display device the overcomes or ameliorates the above disadvantages or at least which provides the public with a useful alternative.

According to a first aspect of the invention there is provided a multiple-display device including at least three body members disposed in juxtaposition, at least two of the body members movable between first and second positions, each body member having a display such that in the first position at least two of the displays are hidden and in the second position all of the displays are visible.

Preferably the multiple-display device includes at least one elongate arm member, and wherein one of the body members is pivotally disposed at each end of the elongate arm member and at least a third body member is pivotally disposed substantially midway between the ends of the elongate arm member.

Preferably the multiple-display device includes a releasable latch operable to retain the at least two body members in the first position, and wherein the at least two body members are biased in the second position such that when the latch is released the at least two body. Members move to the second position.

Preferably the multiple-display device includes a base member on which the latch in disposed, and wherein one body member is fixedly mounted on the base member, and the at least two body members are in juxtaposition the base member when in the first position and at least one of the at least two body members is engaged by the latch.

Preferably the displays are electronic displays indicating one of, time, date or temperature.

According to a second aspect of the invention there is provided a multiple-display device including:

at least one elongate arm member, three body members, one of the body members pivotally disposed at each end of the elongate arm member and the third body member pivotally disposed substantially midway between the ends of the elongate arm member, two of the body members being movable between first and second positions, each body member having a display such that in the first position at least two displays are hidden and in the second position all of the displays are visible, and a releasable latch operable to retain the two body members in the first position, and wherein the two body members are biased in the second position such that when the latch is released the two body members move to the second position.

Further aspects of the invention will become apparent from the following description, which is given by way of example only.

BRIEF DESCRIPTION OF THE DRAWINGS

Embodiments of the invention will now be described with reference to the accompanying drawings in which.

DESCRIPTION OF THE PREFERRED EMBODIMENTS

Figure 1:
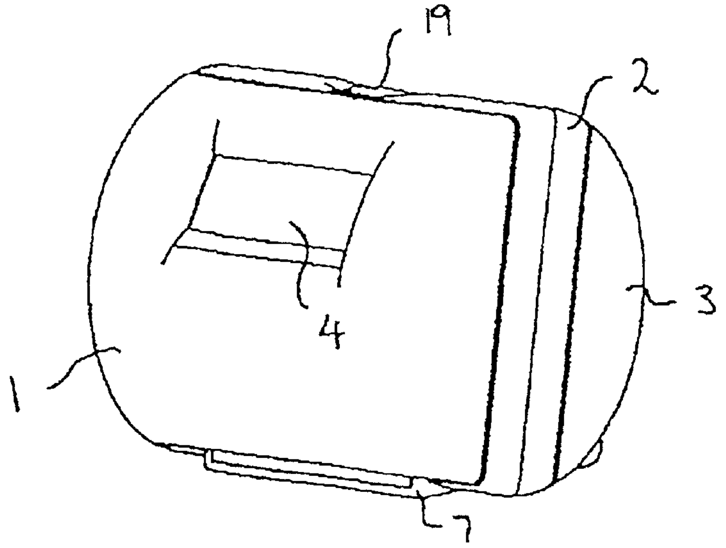
FIG. 1 illustrates a first perspective view of a multiple display clock according to the invention.
Figure 2:
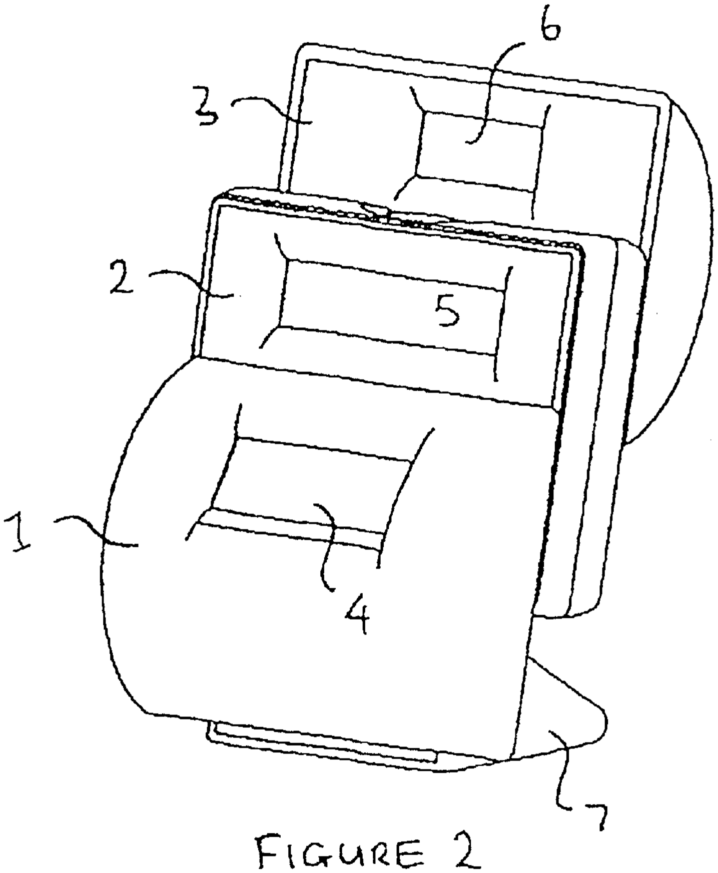
FIG. 2 illustrates a second perspective view the clock.
Figure 3:
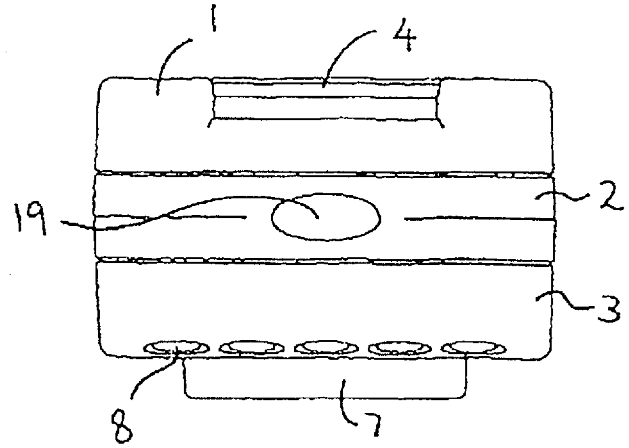
FIG. 3 illustrates a top view of the clock.
Figure 4:
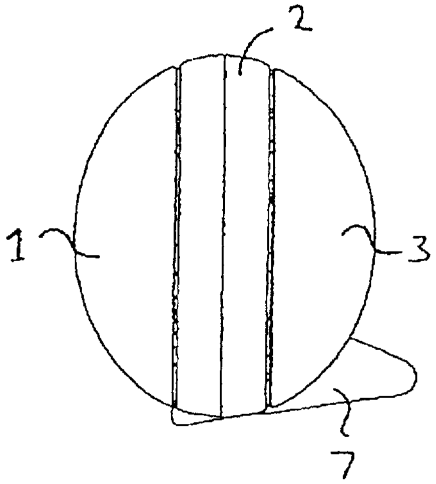
FIG. 4 illustrates a side view of the clock.
Figure 5:
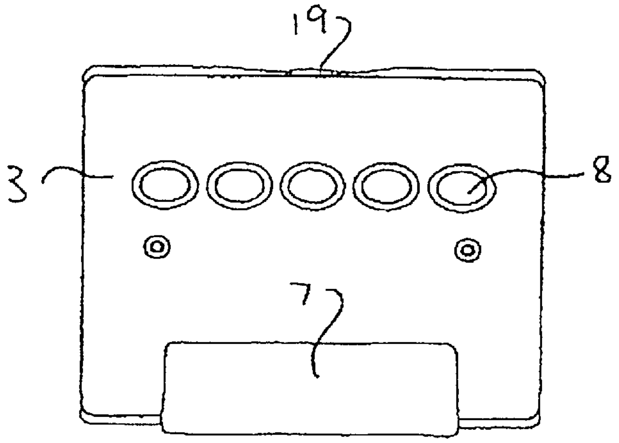
FIG. 5 illustrates a back view of the clock, FIG. 6 illustrate a first sectional view through the clock.
Figure 6:
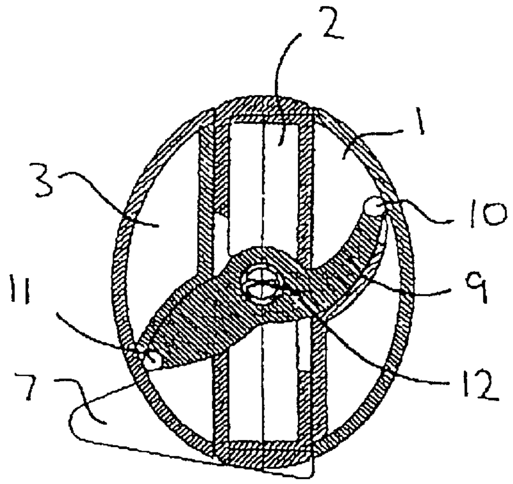

In the preferred embodiment a multiple-display device includes three body members 1, 2, 3 dispose in Juxtaposition to form a substantially cylindrically shaped body. The three body members 1. 2, 3 are movable between a first position, as shown in FIG. 1, and a second position, as shown in FIG. 2. Each body member 1, 2, 3 has a liquid crystal display 4, 5, 6 The multiple-display clock also has a base member in the form foot 7 for supporting it on a flat surface. One of the body members 3 has a plurality of button 8 to facilitate functions control in known manner.

In the first position two of the liquid crystal displays 5, 6, on two body members 2, 3, are hidden from view so as only a main liquid display 1 is visible. In the second position all three crystal liquid displays 4, 5, 6 are visible. In the preferred embodiment the first liquid crystal display 4 shows time, second liquid crystal display 5 shows date and third liquid crystal display 6 shows temperature. Referring to FIGS. 6 to 10, the multiple display device also includes two arm members 9, 9'. The two outermost body members 1 and 3 are pivotally mounted on either end 10, 11 of arm members 9, 9'. Middle body member 2 is pivotally mounted at a pivot 2 located centrally between the ends 10, 11 of arm members 9, 9 The pivotal connection of the body members 1, 2, 3 about a members 9, 9' allows them to move relative to each other between the first position to the second position. First body member 1 is flexibly connected to foot 7 so that second and third body members 2, 3 move relative to body member 1 which stays in a flexibly location.

A biasing spring 20 about pivot 12 biases the second and third body members 2, 3 in the second position.

A releasable latch 13 is pivotally mounted at a pivot 15 on foot member 7. A spring 16 biases catch 17 in a closed position. When the second and third body members 2, 3 are in the first position the catch 13 engages through an opening 14 of third body member 3 to retain the body member 3, and consequently also second body member 2, in the first position. This can be seen in FIG 7.

Figure 7:
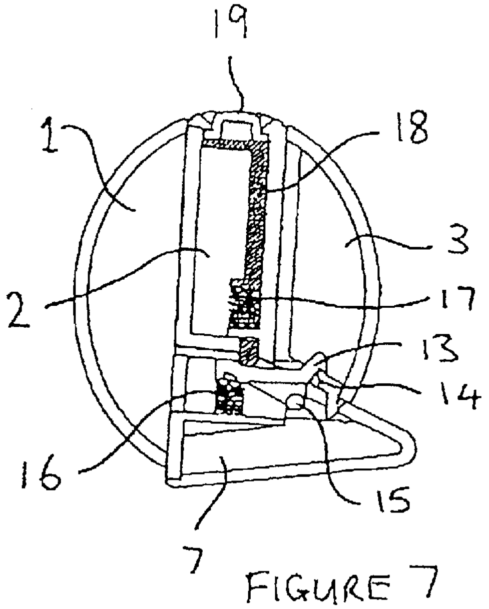
FIG. 7 illustrates a second sectional view through the clock.
Figure 8:
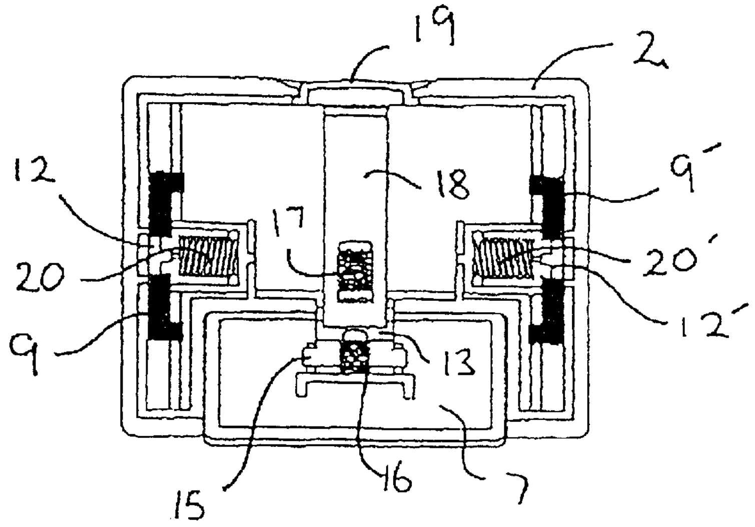
FIG. 8 illustrates a third sectional view through the clock.
Figure 10:
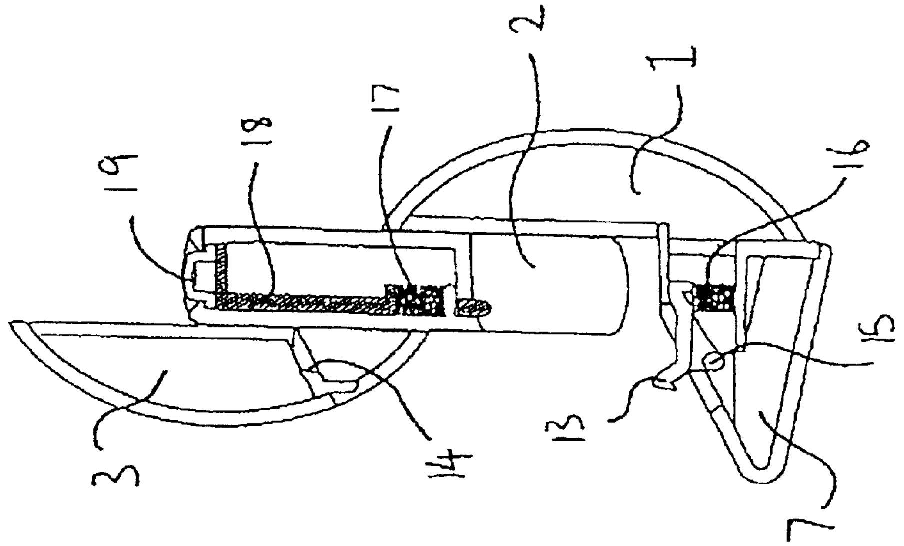
FIG. 10 illustrates a fifth sectional view through the clock.
Figure 9:
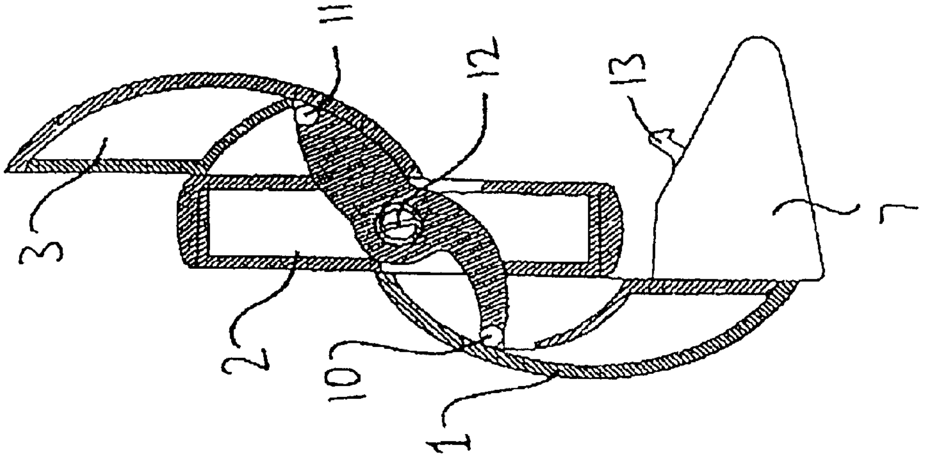
FIG. 9 illustrates a forth sectional view through the clock.

Centrally located through second body member 2 is a spring 17 biased rod 18 engaged with a button 19 on the top of second body member 2 Referring to FIG. 7, when button 19 is pressed rod 18 depresses latch 13 against spring 16 releasing the latch 13 from opening 14 in body member 3 Once released from latch 13 third body member 3, and second body member 2, are free to move to the second position under the influence of bias spring 20.

A user can "close" the clock by moving the second and third members 2, 3 back to the first position where the opening 14 in third body member 3 engages with latch 13 again.

According to the invention there is a display device with a clear time display upon pressing a button on the top several body portions of the displays are moved to a position that exposes additional displays indicating date and temperature.

where in the foregoing description reference has been made to integers or elements have known equivalents then such are included as if individually set forth herein .

Embodiments of the invention have been described, however it is understood that variations, improvement or modifications can take place without departure from the spirit of the invention or scope of the appended claims.

What is claimed is:

1. A multiple-display including at least three body members disposed in juxtaposition, at least two of the body members movable between first and second positions, each body member having a display such that in the first position at least two of the displays are hidden and in the second position all of the displays are visible, said multiple-display device further including at least one elongate arm member, and wherein one of the body members is pivotally disposed at each end of the elongate arm member and at least a third body member is pivotally disposed substantially midway between the ends of the elongate arm member.

2. A multiple-display device as claimed in claim 1 including a releasable latch operable to retain the at least two body members in the first position, and wherein the at least two body members are biased in the second position such that when the latch is released the at least two body members move to the second position.

3. A multiple-display device as claimed in claim 2 including a base member on which the latch is disposed, and wherein one body member is fixedly mounted on the base member, and the at least two body members are in juxtaposition the base member when in the first position and at least one of the at least two body members is engaged by the latch.

4. A multiple-display device as claimed in claim 1 wherein the displays are electronic displays indicating one of, time, date or temperature.

5. multiple-display device including:

at least one elongate arm member, three body members, one of the body members pivotally disposed at each end of the elongate arm member and the third body member pivotally disposed substantially midway between the ends of the elongate arm member, two of the body members being movable between first and second positions, each body member having a display such that in the first position at least two display are hidden and in the second position all of the displays are visible, and a releasable latch operable to retain the two body members in the first position, and wherein the two body members are biased in the second position such that when the latch is released the two body members move to the second position.

* * * * *